A. R. THOMPSON.
FRUIT AND VEGETABLE WASHER.
APPLICATION FILED APR. 3, 1920.
1,352,393.
Patented Sept. 7, 1920.
3 SHEETS—SHEET 2.
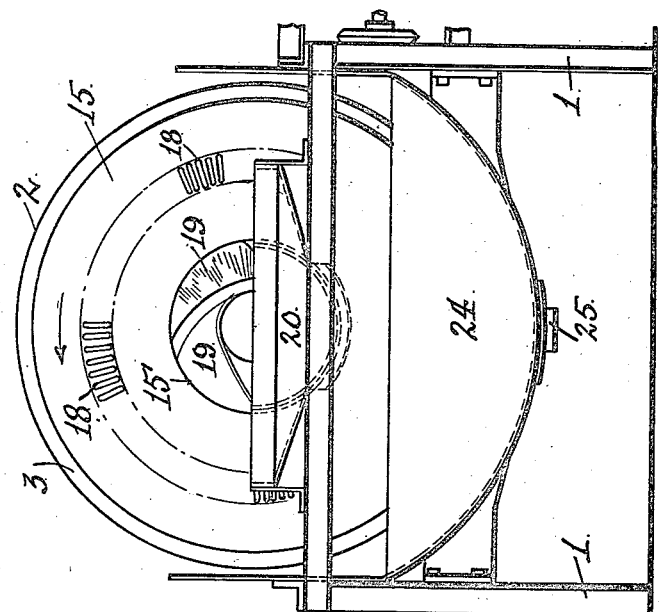
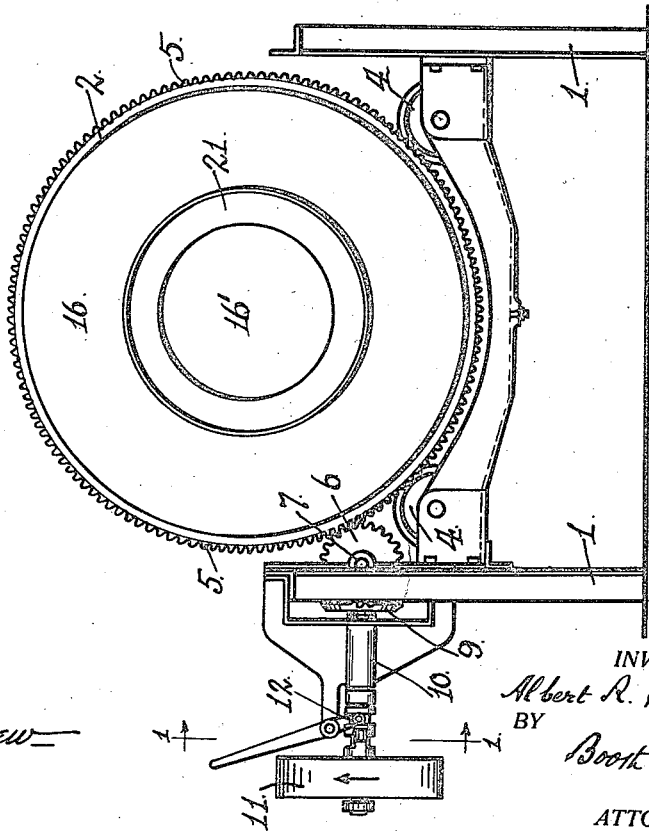
WITNESS
INVENTOR
Albert R. Thompson
BY
Booth & Booth
ATTORNEYS

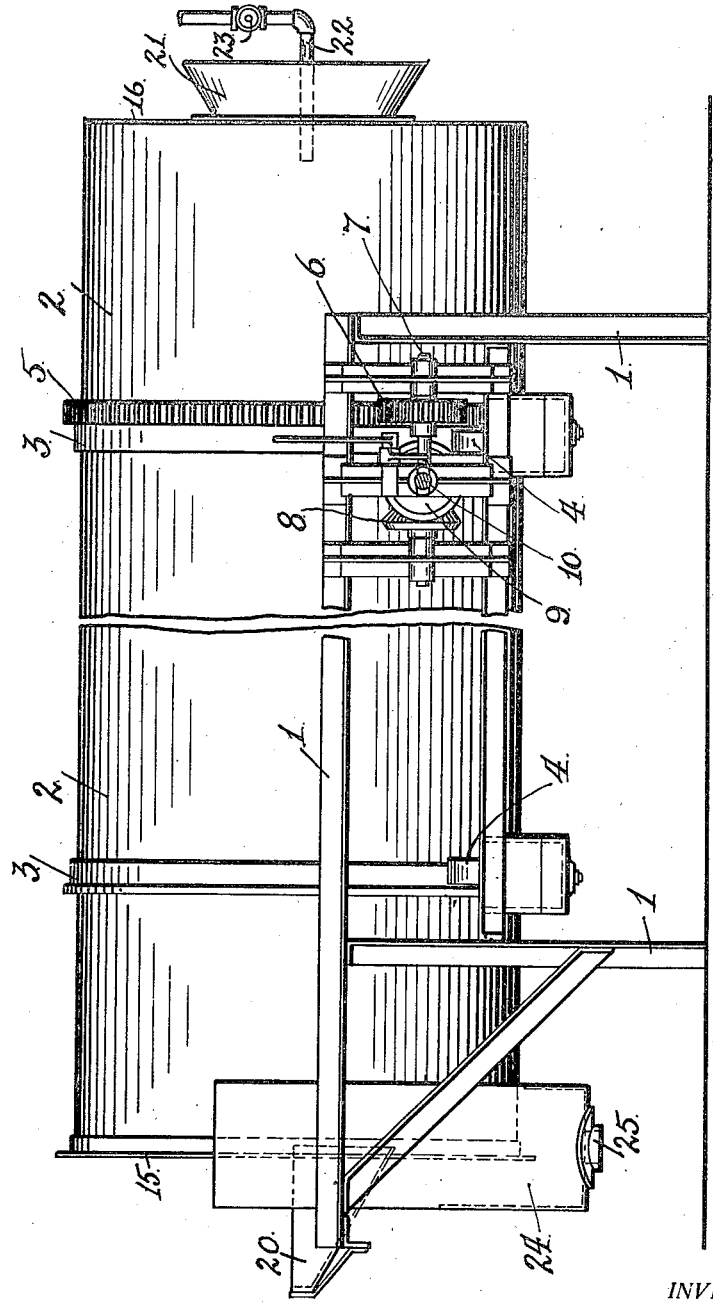

A. R. THOMPSON.
FRUIT AND VEGETABLE WASHER.
APPLICATION FILED APR. 3, 1920.

1,352,393.

Patented Sept. 7, 1920.
3 SHEETS—SHEET 3.

WITNESS

INVENTOR
Albert R. Thompson
BY
Booth & Booth
ATTORNEYS

UNITED STATES PATENT OFFICE.

ALBERT R. THOMPSON, OF SAN JOSE, CALIFORNIA, ASSIGNOR TO ANDERSON-BARN-GROVER MFG. CO., OF SAN JOSE, CALIFORNIA, A CORPORATION OF CALIFORNIA.

FRUIT AND VEGETABLE WASHER.

1,352,393.  Specification of Letters Patent.  Patented Sept. 7, 1920.

Application filed April 3, 1920. Serial No. 370,935.

*To all whom it may concern:*

Be it known that I, ALBERT R. THOMPSON, a citizen of the United States, residing at San Jose, in the county of Santa Clara and State of California, have invented certain new and useful Improvements in Fruit and Vegetable Washers, of which the following is a specification.

My invention relates to the general class of fruit and vegetable washers, and though it is adapted for the removal of any matter, substance, material or debris either foreign to or a part of the article, it is particularly intended for the removal of the peel or skin of fruits, such, for example, as peaches and apricots, after they have been subjected to a lye bath, by the action of which the peel or skin is disintegrated or reduced to a soft pulp, easily rubbed, brushed or washed off, thus leaving the fruit in condition for canning.

Approved practice in this art of peeling fruit requires the washing effect of water rather than brushing or rubbing. This effect has sometimes been produced by sprays or jets of water forcibly directed; sometimes by more or less forcible agitation of the fruit in the water, and sometimes by a successive throwing of the fruit into the water bath.

My invention belongs more particularly to the last named type of washers, in that the fruit is advanced through the washing tank and during its course is repeatedly elevated from and dropped into the water.

One object of my invention is to provide for the advance of the fruit in one direction in connection with a body of water constantly flowing in the other direction, whereby practically fresh water is in use all the time.

Another object is to keep the fruit constantly and uniformly moving, part of the time through the water body, and part of the time being elevated therefrom and dropped thereinto, to the end that continuous and pronounced, but non-injurious agitation be maintained to thoroughly remove the adhering skin or peel pulp.

Another object is to provide automatically for a practically constant volume and flow of water through the tank.

With these and other objects in view, my invention consists in the novel fruit and vegetable washer, which I shall hereinafter fully describe by reference to the accompanying drawings, in which—

Figure 1 is a side elevation of my washer, viewed from the section line 1—1 of Fig. 3, in the direction of the arrows.

Fig. 2 is a head-end view of the washer.

Fig. 3 is a foot-end view of the same.

Figure 4:
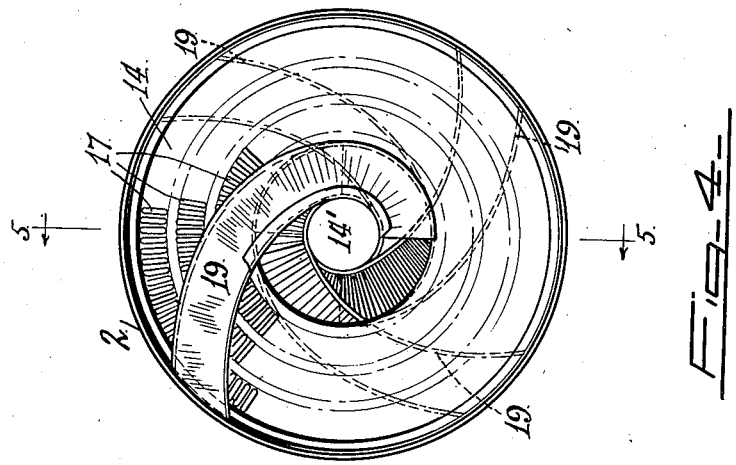
Fig. 4 is a head or feed-end view of the tank viewed from the line 4—4 of Fig. 5, the head plate being removed.

1 is a frame, in which is mounted, for rotation on its axis, the tank 2. The tank is circumferentially-imperforate and has circumferential tracks 3 which rest on rollers 4 carried by the frame 1, and rotation is imparted by means of a circumferential gear 5, a pinion 6 meshing with the gear, a counter shaft 7 carrying the pinion, a bevel gear 8 on said shaft, a second bevel gear 9 on the drive shaft 10, a drive pulley 11 and a clutch mechanism 12, all as shown in Figs. 1 and 3.

Figure 5:
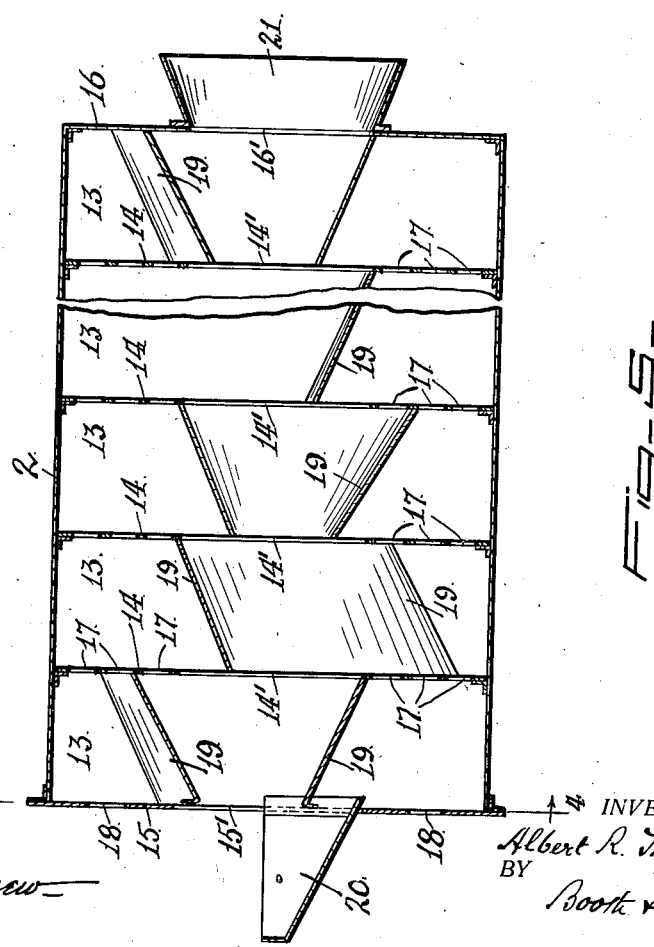
Fig. 5 is a section of the same on the line 5—5 of Fig. 4.

The interior of the tank is divided into a plurality of cross compartments 13, Fig. 5, by the transverse partitions 14, the head-plate 15 and the foot-plate 16. There may be any desired number of these compartments.

Each partition has a central opening 14', the head-plate has a central opening 15' and the foot-plate has a central opening 16'. All of these openings register throughout the length of the tank, so that the compartments 13 successively centrally communicate.

Each partition 14, as shown in Fig. 4, has a plurality of annular rows of slits or perforations 17. These rows are concentric and occupy substantially the entire area of the partition.

As seen in Figs. 2 and 5, the head plate 15 has a single ring of slits or perforations 18, but the foot-plate 16 is not perforated, except by its central opening.

Within each compartment 13 is a volute or spiral vane 19. Each vane in width traverses its compartment on a lateral incline, and is carried by the side walls thereof; and each in length extends from a common imaginary axis-circle or circumference to the outer wall of its compartment, as seen in Fig. 4. The vanes, though symmetrical in Fig. 4, are not in longitudinal alinement but are arranged symmetrically about the circumferential area of the tank, not only in order to advance the material uniformly and stream-like through the machine, but also to provide by their systematic successive retrogression for a clear drop of the material into the water of each successive compartment without interference from or falling on the vane, which might injure the fruit.

Fitted to the opening 15' of the head-plate 15 is the feed hopper 20, and fitted to the opening 16' of the foot-plate is the discharge chute 21. Into the opening 16' of the foot plate leads the water-pipe 22 (Fig. 1) controlled by a cock 23.

Carried by the frame 1 is a debris tank 24, Figs. 1 and 2, into which the head end of the tank dips. This tank receives the wash water and washed off debris from the main tank, and provides by its controllable outlet 25 for the proper disposition of its contents.

The operation is as follows:—

The material to be washed is supplied through the feed hopper 20 to the head compartment of the rotating tank 2. A stream of water is turned into the foot compartment of the tank from the pipe 22. In the head compartment the material is picked up by the spiral vane 19 therein and is raised to and passed forward through the central opening in the first partition into the next compartment, being plunged into the water therein without obstruction from the second vane; but as said second vane advances it in turn picks up the fruit and advances it to and drops into the water in the third compartment, and so on through all the compartments. The lateral inclination of the vanes causes the material to slide by gravity to and through the central openings. Meanwhile a body of water occupies the lower portion of the tank and is continuously flowing through the perforated partitions in a direction opposite to the flow or passage of the material and said material is repeatedly and successively dropped into the water. This action together with the general agitation of rotation effectually washes the material. The washed material is delivered through the discharge chute 21 while the washed off substances, dirt, peel, skins and other debris are delivered with the washing water into the debris tank 24.

A point of advantage in providing the plurality of concentric annular rows of slits or perforations 17 in the partitions 14 lies in the ability of said slits to automatically take care of any undue excess of water in the tank, for it will be seen that as the volume of water increases and the level rises, the water will find rapidly increasing slit capacity by reason of the fact that successive inner rows of slits are brought into function, to accommodate the increase in volume, and prevent it, within reasonable limits of supply, from getting so high as to interfere with the progress and effective drop of the material.

I claim:—

1. A washer comprising a rotatable tank; annular partitions dividing the tank interiorly into a plurality of cross compartments centrally communicating successively, said partitions having a ring of perforations; a spiral vane in each compartment disposed to elevate the material in its compartment and direct it through the central aperture of a partition, into the next compartment; means for introducing the material to the head compartment of the tank and delivering it from the foot compartment thereof; and means for introducing water to the foot compartment of the tank and discharging it from the head compartment thereof.

2. A washer comprising a rotatable tank; annular partitions dividing the tank interiorly into a plurality of cross compartments centrally communicating successively, said partitions having a ring of perforations; a spiral vane in each compartment disposed to elevate the material in its compartment and direct it through the central aperture of a partition into the next compartment, said vanes being symmetrical and springing successively from different points about the axis of the compartment and terminating in different points in the outer wall thereof; means for introducing the material to the head compartment of the tank and delivering it from the foot compartment thereof; and means for introducing water to the foot compartment of the tank and discharging it from the head compartment thereof.

3. A washer comprising a rotatable tank; annular partitions dividing the tank interiorly into a plurality of cross compartments centrally communicating successively said partitions having a plurality of concentric rings of perforations from their central aperture to their rims; a spiral vane in each compartment disposed to elevate the material in its compartment and direct it through the central aperture of a partition, into the next compartment; means for introducing the material to the head compartment of the tank and delivering it from the foot compartment thereof; and means for introducing water to the foot compartment of the tank and discharging it from the head compartment thereof.

4. A washer comprising a rotatable, circumferentially-imperforate tank; means secured within and rotating with the tank for advancing the material therethrough and elevating and dropping it repeatedly during its progress, said means consisting of annular, perforate, spaced partitions, and a spiral vane between said partitions; and means for supplying and maintaining a stream of water flowing in the lower portion of the tank through the perforations of the partitions.

5. A washer comprising a rotatable, circumferentially-imperforate tank having an annular perforate head end and an annular imperforate foot end; annular, perforate partitions secured to and spaced within the tank, dividing the interior into a plurality of cross compartments centrally communicating successively, the end compartments communicating with the exterior through the annular ends of the tank; means for introducing the material through the annular head end of the tank, to the head compartment; a spiral vane rigidly mounted in each compartment, each vane being disposed to elevate the material in its compartment and to direct it through the central opening of the annular partition into the next compartment, and through the annular foot end of the tank to the exterior; and means for supplying and maintaining a stream of water in the lower portion of the tank, introduced through the annular foot end of the tank and flowing through the perforate partitions and through the perforate head end of the tank to the exterior.

6. A washer comprising a rotatable tank; means within the tank for advancing the material therethrough and elevating and dropping it repeatedly during its progress; means for effecting a continuously flowing body of water through the lower portion of the tank in a direction opposite to the travel of the material therethrough; and means for automatically regulating the volume of water passing through the tank.

In testimony whereof I have signed my name to this specification.

ALBERT R. THOMPSON.